(12) United States Patent
Baek et al.

(10) Patent No.: US 9,546,792 B2
(45) Date of Patent: *Jan. 17, 2017

(54) COOKER

(71) Applicant: LG ELECTRONICS INC., Seoul (KR)

(72) Inventors: Chae Hyun Baek, Seoul (KR); Jeong Ho Lee, Seoul (KR); Yong Soo Lee, Seoul (KR); Seung Chan Lee, Seoul (KR); Yang Kyeong Kim, Seoul (KR); Seung Jo Baek, Seoul (KR); Young Seok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/561,474

(22) Filed: Dec. 5, 2014

(65) Prior Publication Data

US 2015/0083109 A1    Mar. 26, 2015

Related U.S. Application Data

(63) Continuation of application No. 12/832,722, filed on Jul. 8, 2010, now Pat. No. 8,955,508.

(30) Foreign Application Priority Data

Jul. 15, 2009    (KR) .................. 10-2009-0064678

(51) Int. Cl.
*F24C 15/34* (2006.01)
*F24C 15/00* (2006.01)
*F24C 7/00* (2006.01)
*F24C 14/00* (2006.01)

(52) U.S. Cl.
CPC ............... *F24C 15/005* (2013.01); *F24C 7/00* (2013.01); *F24C 7/002* (2013.01); *F24C 14/005* (2013.01); *Y10T 428/252* (2015.01)

(58) Field of Classification Search
CPC ........... F24C 7/00; F24C 7/002; F24C 15/005; F24C 14/005; Y10T 428/252
See application file for complete search history.

(56) References Cited

U.S. PATENT DOCUMENTS

| 3,547,098 | A | 12/1970 | Lee |
| 6,511,931 | B1 | 1/2003 | Baldwin |
| 8,955,508 | B2 * | 2/2015 | Baek et al. ............... 126/273 R |
| 2003/0064874 | A1 | 4/2003 | Eckmann et al. |
| 2003/0187118 | A1 | 10/2003 | Aronica et al. |
| 2005/0014625 | A1 | 1/2005 | Espargilliere et al. |
| 2007/0069764 | A1 | 3/2007 | Lewis et al. |

FOREIGN PATENT DOCUMENTS

| CN | 1487240 A | 4/2004 |
| CN | 101182935 A | 5/2008 |
| DE | 19730610 C1 | 10/1998 |
| JP | 11-197026 A | 7/1999 |

(Continued)

*Primary Examiner* — Alexander Markoff
(74) *Attorney, Agent, or Firm* — Dentons US LLP (57) ABSTRACT

A cooker including a first coating layer that is a general ceramic enamel layer and a second coating layer that includes phosphorus oxide-based components are coated on a surface of a cavity corresponding to the inner surface of the cooking chamber. Therefore, the inside of the cooking chamber can be more easily cleaned.

4 Claims, 9 Drawing Sheets

(56) References Cited

FOREIGN PATENT DOCUMENTS

| | | |
|---|---|---|
| JP | 2007-3186 A | 1/2007 |
| KR | 10-1999-0031388 A | 5/1999 |
| KR | 10-2004-0088708 A | 10/2004 |
| KR | 10-2007-0091635 A | 9/2007 |
| KR | 10-2008-0032707 A | 4/2008 |
| KR | 10-2008-0032708 A | 4/2008 |

* cited by examiner

RELATED ART

RELATED ART

RELATED ART

COOKER

CROSS REFERENCE TO RELATED APPLICATIONS

The present application claims priority under 35 U.S.C. 119 and 35 U.S.C. 365 to Korean Patent Application No. 10-2009-0064678, filed on Jul. 15, 2009, and is a continuation of U.S. application Ser. No. 12/832,722, filed Jul. 8, 2010, which are incorporated by reference for all purposes as if fully set forth herein.

BACKGROUND OF THE INVENTION

Field of the Invention

The present invention relates to a cooker, and more particulraly, to a cooker that has a coating layer provided on the inner side of a cooking chamber, and methods of manufacturing and controlling the same.

Description of the Related Art

A cooker is a home appliance that heats food inside a cooking chamber using electricity or gas. An enamel coating layer is provided on the inner surface of the cooking chamber. The enamel coating layer serves to protect the inner surface of the cooking chamber from heat and impact. However, the enamel coating layer has a disadvantage that pollutants generated during a cooking process of food inside the cooking chamber adhere to the walls of the cooking chamber and are not easily removed.

SUMMARY OF THE INVENTION

The present invention proposes to solve the above problem. It is an object of the present invention to provide a cooker that can be easily cleaned of pollutants absorbed into the inner surface of a cooking chamber, and methods of manufacturing and controlling the same.

According to an embodiment of the present invention, there is provided a cooker including: a cavity that is provided with a cooking chamber in which food is cooked; a heating source that provides heat for cooking food inside the cooking chamber; a door that selectively opens and closes the cooking chamber; an input unit that receives signals for cooking food inside the cooking chamber; an output unit that outputs signals to annunciate a status of cooking operations inside the cooking chamber; a first coating layer that is coated on the surface of the cavity corresponding to the inner surface of the cooking chamber; and a second coating layer that is coated on the surface of the first coating layer.

According to another embodiment of the present invention, there is provided a cooker including: a plurality of plates that form a cooking chamber in which food is cooked; a heating source that provides heat for cooking food inside the cooking chamber; a door that selectively opens and closes the cooking chamber; a base coating layer that is coated on the surface of the plates; and a cover coating layer, that is coated on the base coating layer, and contains a greater percentage of hydrophilic components than the base coating layer.

According to another embodiment of the present invention, there is provided a method of manufacturing a cooker that includes a cavity, formed by at least one plate, forming a cooking chamber in which food is cooked, the method including: pretreating a surface of the plate; coating a base coating layer including ceramic components on the surface of the plate; and coating a cover coating layer, which includes phosphorus oxide-based components, onto the surface of the base coating layer.

According to another embodiment of the present invention, there is provided a method of controlling a cooker that includes a cavity, formed by at least one plate, forming a cooking chamber in which food is cooked, a first coating layer that is coated on a surface of the cavity corresponding to an inner surface of the cooking chamber, a second coating layer that is coated onto the surface of the first coating layer, a heating source that provides heat for cooking food inside the cooking chamber, and an output unit that outputs signals, the method including: supplying cleaning water to the inside of the cooking chamber; and if the supply of the cleaning water to the inside of the cooking chamber is completed, allowing the output unit to output signals informing thereof.

With the present invention, the inside of the cooking chamber can be more easily cleaned.

DESCRIPTION OF THE PREFERRED EMBODIMENTS

Hereinafter, an embodiment of a cooker according to the present invention will be described in detail with reference to the accompanying drawings.

Figure 1:
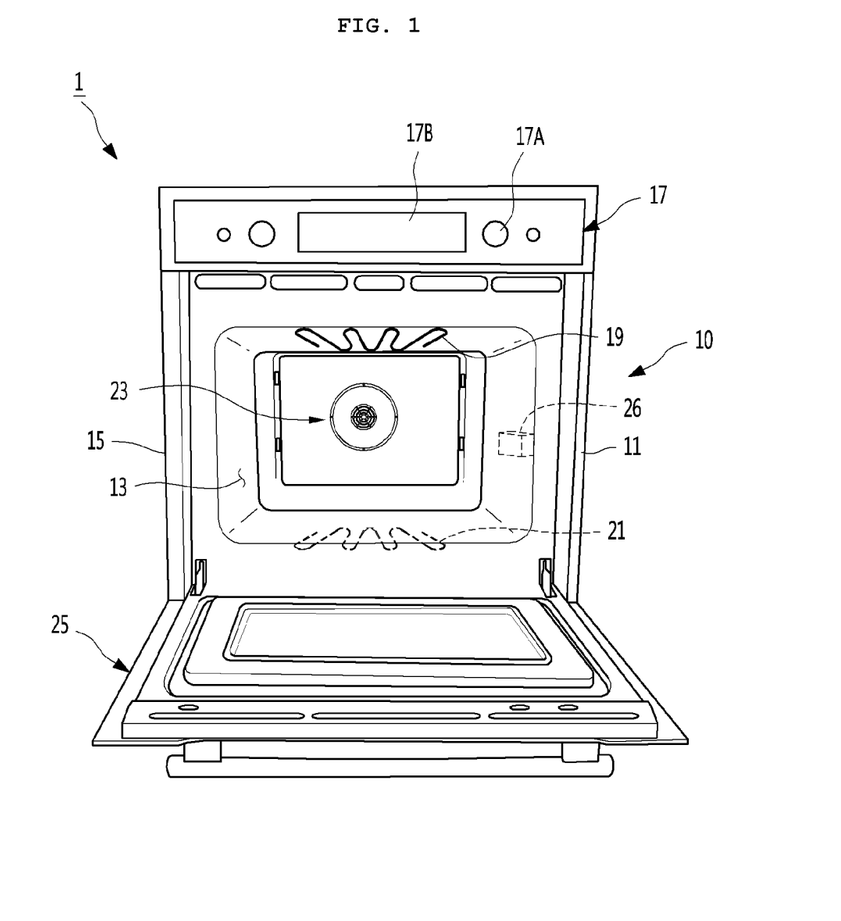
FIG. 1 is a perspective view showing an embodiment of a cooker according to the present invention.
Figure 2:
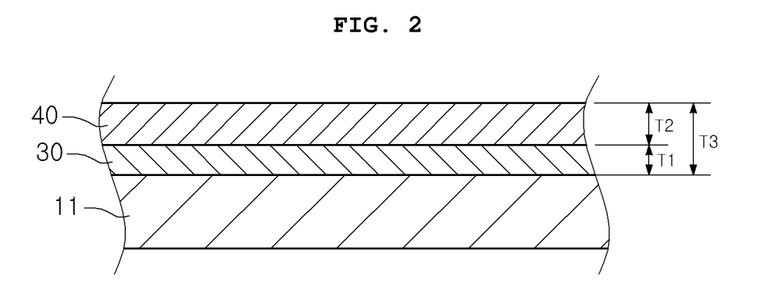
FIG. 2 is a longitudinal cross-sectional view showing the main part of the embodiment of the present invention.

FIG. 1 is a perspective view showing an embodiment of a cooker according to the present invention, and FIG. 2 is a longitudinal cross-sectional view showing the main parts of the embodiment of the present invention.

Referring to FIG. 1, a cavity 11 is provided inside a main body 10 of the cooker 1. The cavity 11 forms a cooking chamber 13 in which food is cooked. The cavity 11 is formed approximately in a hexahedral shape of which a front surface is opened. The cavity 11 may be formed by at least one plate or a plurality of plates. As the plate forming the cavity 11, low carbon steel, for example, carbon steel whose carbon content is 0.008 wt % to 0.040 wt %, may be used. This is to facilitate the application of a coating layer to be described later.

An outer case 15 forms the appearance of an upper surface and both side surfaces of the main body 10. The outer case 15 surrounds the upper portion and both sides of the cavity 11.

A control panel 17 is installed on a front upper portion of the main body 10 corresponding to the upper portion of the cooking chamber 13. The control panel 17 includes an input unit 17A that receives signals for operating the cooker 1 and an output unit 17B that outputs the signals according to the operation of the cooker 11. In the present embodiment, the output unit 17B is shown as a display that outputs visual signals, but the output unit 17B can output at least one of visual and auditory signals. Also, if a soaking time to be described later is completed, the output unit 17B outputs signals informing a user of such completion.

A plurality of heating sources that heat food are provided in the cavity 11. The cavity 11 includes an upper heater 19, a lower heater 21, and a convection device 23. The upper heater 19 and the lower heater 21 are installed adjacent to the upper and the lower surfaces of the cooking chamber 13, respectively. And, the convection device 23 is installed at the rear surface of the cooking chamber 13. The upper heater 19 and the lower heater 21 may radiate heat to cook the food inside the cooking chamber 13, and the convection device 23 performs convection heating on the food inside the cooking chamber 13. Optionally, a cleaning water supplying unit 26 may be included inside the main body 10 to supply cleaning water to inside the cooking chamber 13.

The cooking chamber 13 is selectively opened and closed by a door 25. The door 25 opens and closes the cooking chamber 13 in a pull-down scheme in that its upper edge rotates with respect to the main body 10.

Meanwhile, a coating layer is provided on the inner surface of the cooking chamber 13, that is, on the surface of the cavity 11. The coating layer is substantially provided on the surface of the plate that forms the cavity 11. The coating layer serves to improve heat-resistance, acid-resistance, durability, and cleanness of the inner surface of the cooking chamber 13. Referring to FIG. 2, the coating layer includes first and second coating layers 30 and 40 in the present embodiment.

More specifically, the first coating layer 30 is coated directly on the surface of the cavity 11. In the present embodiment, the first coating layer 30 contains ceramic components that constitute a general enamel coating layer. And, the second coating layer 40 is coated on the surface of the first coating layer 30. The second coating layer 40 contains phosphorus oxide-based ($P_xO_y$) components. Therefore, the first and second coating layers 30 and 40 may be named as a base coating layer and a cover coating layer, respectively. The phosphorus oxide-based components contained in the second coating layer 40 relatively have hydrophilicity compared to the ceramic components contained in the first coating layer 30. The bonding strength of pollutants, generated during the process of cooking food inside the cooking chamber 13, and absorbed into the second coating layer 40, having the hydrophilicity as described above, is smaller (i.e., pollutants are bonded by relatively small magnitude of force) than the bonding strength of the same pollutants absorbed into an enamel coating layer of the related art. The detailed description thereof will be described later.

Meanwhile, the second coating layer 40 includes 27.1-35.3 wt % $P_2O_5$, 14.6-28.4 wt % $Al_2O_3$, 12.8-20.3 wt % $ZrO_2$, 18.7-28.8 wt % mother glass constitution components, and 17.2-25.4 wt % ceramic fillers. More preferably, the second coating layer 40 is a cooker including 28.7-33.4 wt % $P_2O_5$, 15.2-24.3 wt % $Al_2O_3$, 13.5-17.2 wt % $ZrO_2$, 19.6-26.5 wt % mother glass constitution components, and 17.8-22.4 wt % ceramic fillers.

Herein, the mother glass constitution components may include at least one of $BaO$, $K_2O$, $Na_2O$, $CO_2O_3$, $ZnO$, $Li_2O$, $TiO_2$, $B_2O_3$, $P_2O_5$, and $SiO_2$. And, the ceramic fillers may include at least one of $ZrSiO_4$, $ZrO_2.SiO_2$, $ZrO_2$, eucryptite, $Al_2O_3$, $2MgO.2Al_2O_3.5SiO_2$, and zinc compound.

In the present embodiment, the hydrophilicity of the second coating layer 40 is in proportion to the content of $P_2O_5$. The increase in the hydrophilicity of the second coating layer 40 allows the pollutants generated during the process of cooking and heating food inside the cooking chamber 13 and absorbed into the second coating layer 40 to be easily removed by a polar solvent. This will be described later.

The softening point of the second coating layer 40 is in proportion to the content of the ceramic filler. Therefore, the heat-resistance of the second coating layer 40 can be improved by increasing the content of the ceramic filler. The selection of the ceramic filler may be made in consideration of low thermal expansion coefficient, etc.

Meanwhile, the first coating layer 30 and the second coating layer 40 are coated on the inner surface of the cooking chamber 13 and the surface of the first coating layer 30, respectively, at a predetermined thickness. For example, the sum T3 of the thickness T1 and T2 of the first and second coating layers 30 and 40 may be set to the value equal to or less than the thickness of common coating layer. However, the thickness of the first coating layer 30 is set to the value less than the thickness of the second coating layer 40.

The thickness of the first and second coating layers 30 and 40 as above is for securing intensity in consideration of the thermal expansion of the first and second coating layers 30 and 40. In other words, as the thickness of the first and second coating layers become thick, the intensity thereof is increased, but it may lead to the damage by the thermal expansion of the first and second coating layers 30 and 40. To the contrary, as the thickness of the first and second coating layers 30 and 40 become thin, it may lead to the reaction with the inner surface of the cooking chamber 13, that is, an iron plate forming the cavity 11, as well as the lowering in the intensity. If the thickness of the first coating layer 80, the thickness of the second coating layer 40, and the thickness of the first and second coating layers 30 and 40 are determined within the range as described above, the sufficient intensity can be secured, while preventing the damage due to the thermal expansion of the first and second coating layers 30 and 40.

Hereinafter, the embodiment of the cooker according to the present invention will be compared with the absorption of the cooking chamber in the related art.

Figure 3:
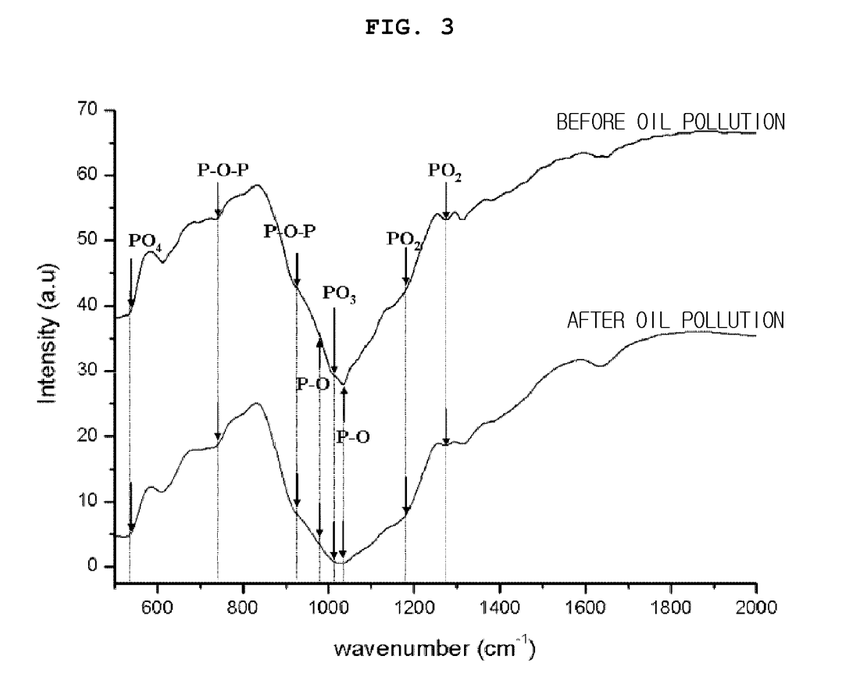
FIG. 3 is a graph showing the results of FTIR analysis on the inner surface of the cooking chamber before and after the cooking chamber is polluted in the embodiment of the cooker according to the present invention.
Figure 4:
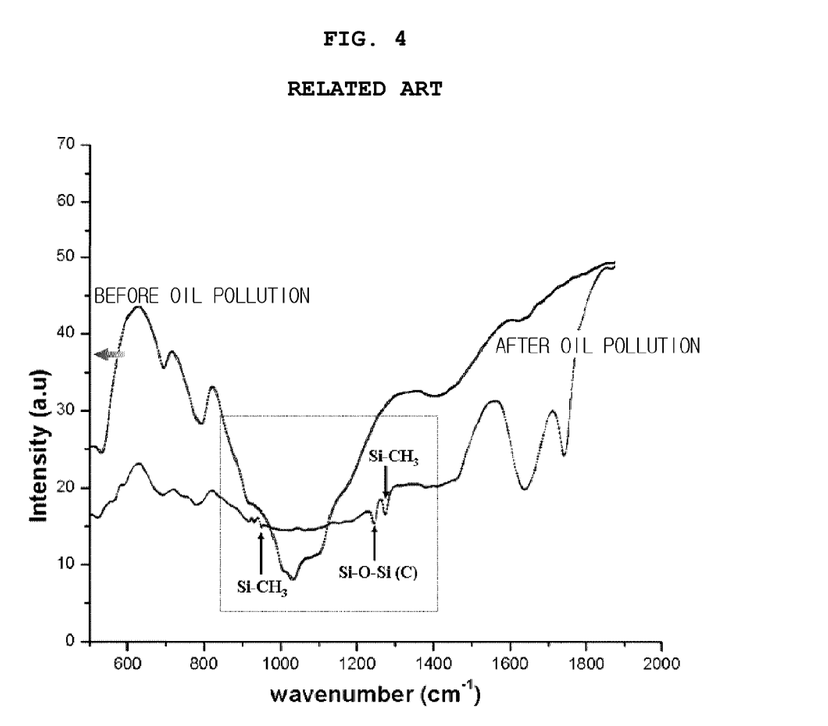
FIG. 4 is a graph showing the results of FTIR analysis on before/after the inner surface of the cooking chamber before and after the cooking chamber is polluted in the embodiment of the cooker according to the related art.

FIG. 3 is a graph showing the results of Fourier Transform Infrared Spectroscopy (FTIR) analysis on the inner surface of the cooking chamber before and after the cooking chamber is polluted in the embodiment of the cooker according to the present invention. FIG. 4 is a graph showing the results of FTIR analysis on the inner surface of the cooking chamber before and after the cooking chamber is polluted in the embodiment of the cooker according to the related art.

First, referring to FIG. 3, in the cooker according to the embodiment of the present invention, a chemical bonding between the second coating layer 40 and the pollutants are not definitely found on the inner surface of the cooking chamber 13. Therefore, it can be appreciated that the absorption between the second coating layer 40 and the pollutants is caused by Van der Waals reciprocal action, that is, Van der Waals interaction.

Meanwhile, referring to FIG. 4, in the cooker according to the related art in which an enamel coating layer formed of ceramic material is coated on the inner surface of the cooking chamber 13, a chemical bonding between Si that is the main component of the enamel coating layer and hydrocarbon (CnHm)-based that is the molecular structure of organic material constituting the pollutants is found. This means that as the pollutants and Si—O—Si on the surface of the enamel coating layer forms a chemical bonding, the enamel coating layer and the pollutants are relatively strongly absorbed compared to the Van der Waals interactions between the second coating layer 40 and the pollutants as described. In other words, in the related art, the pollutants of oil or organic material such as protein to be dispersed while heating and cooking food inside the cooking chamber 13 are absorbed and chemically bonded to the enamel cover layer under high temperature.

Therefore, with the present invention, the pollutants are absorbed to the second coating layer 40 by the Van der Waals interaction so that the pollutants are absorbed by relatively weak force compared to the pollutants absorbed to the enamel coating layer by the chemical bonding in the cooker according to the related art. Therefore, it can be appreciated that the pollutants absorbed to the second coating layer 40, that is, the second coating layer 40 containing a much greater quantity of hydrophilic components, can be easily removed compared to the pollutants absorbed to the enamel coating layer in the related art.

Hereinafter, first and second embodiments of a method of manufacturing a cooker according to the present invention will be described in more detail with reference to the accompanying drawings.

Figure 5:
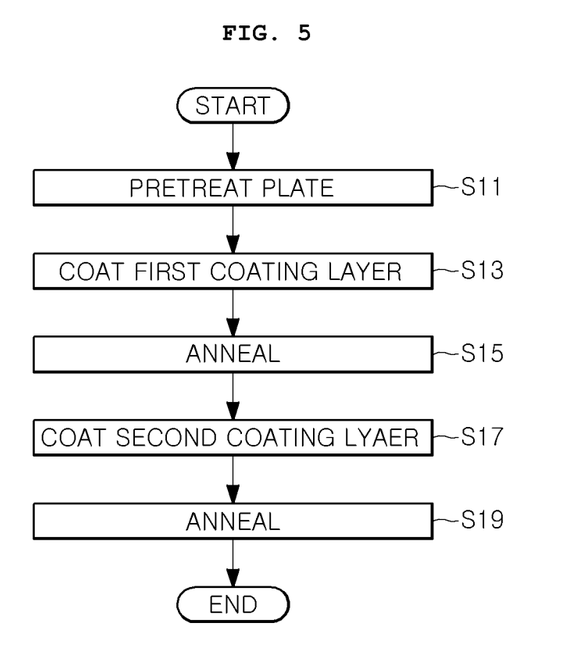
FIG. 5 is a control flow chart showing a first embodiment of a method of manufacturing a cooker according to the present invention.
Figure 6:
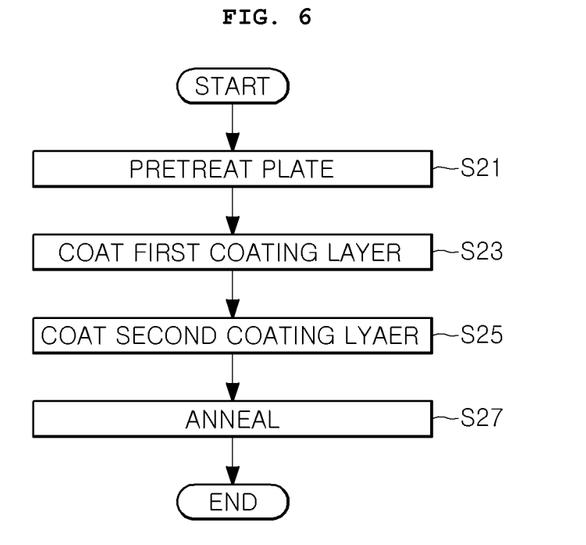
FIG. 6 is a control flow chart showing a second embodiment of the method of manufacturing the cooker according to the present invention.

FIG. 5 is a control flow chart showing a first embodiment of a method of manufacturing a cooker according to the present invention, and FIG. 6 is a control flow chart showing a second embodiment of the method of manufacturing the cooker according to the present invention.

Referring to FIG. 5, in the first embodiment of the present invention, first, a plate that forms an inner surface of a cooking chamber 13, that is, a cavity 11, is pretreated (S11). The pretreatment of the plate is for removing anti corrosion oil, etc. on the surface of low carbon steel that forms the plate.

Then, a first coating layer 30 is coated on the surface of the plate (S13). Then, the plate coated with the first coating layer 30 is annealed (S15). Next, a second coating layer 40 is coated on the surface of the first coating layer 30. Finally, the plate coated with the first and second coating layers 30 and 40 is annealed (S19).

Referring to FIG. 6, in the second embodiment of the present invention, first, the surface of a plate that forms a cavity 11 is pretreated (S21). Then, a first coating layer 30 is coated on the surface of the plate (S23). Next, a second coating layer 40 is coated on the surface of the first coating layer 30 (S25). Then, the plate coated with the first and second coating layers 30 and 40 is annealed (S27).

In the first and second embodiments of the method of manufacturing the cooker according to the present invention as described above, the coating of the first and second coating layers 30 and 40 on the surface of the plate that forms the cavity 11 and the annealing of the plate coated with the first coating layer 30 or the first and second coating layers 30 and 40 may be performed before the plate forms the cavity 11 or after the plate forms the cavity 11. Also, the first and second coating layers 30 and 40 may be coated on the surface of the plate or the surface of the first coating layer 30 in a wet manner or a dry manner. For example, the first and second coating layers 30 and 40 may be coated on the surface of the plate or the surface of the first coating layer 30 through wet impregnation or dry spray.

And, the forming of the cavity by the plate may be performed before or after the first and second coating layers 30 and 40 are coated on the surface of the plate. In other words, the first and second coating layers 30 and 40 may be coated after the cavity 10 is formed by the plate or the cavity 10 may be formed by the plate coated with the first and second coating layers 30 and 40. Also, the cavity 10 may be formed by one plate or a plurality of plates.

Hereinafter, a method of controlling a cooker according to the present invention will be described in more detail with reference to the accompanying drawings.

Figure 7:
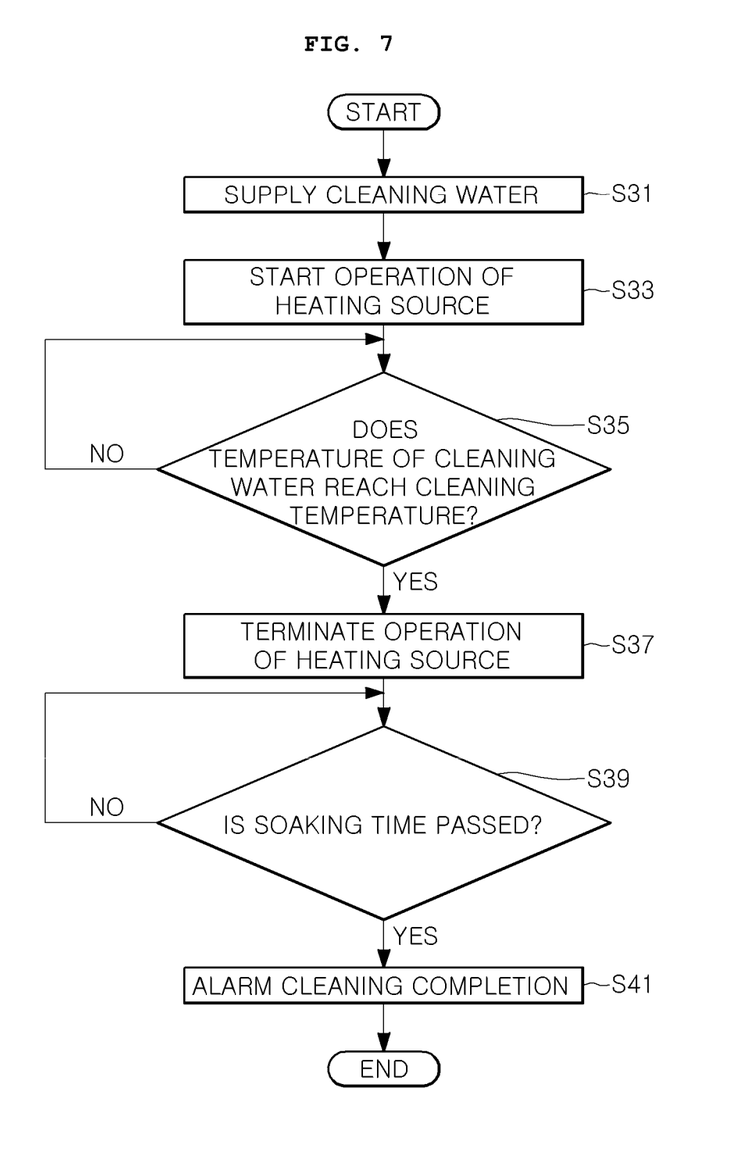
FIG. 7 is a control flow chart showing an embodiment of the method of manufacturing the cooker according to the present invention.
Figure 8:
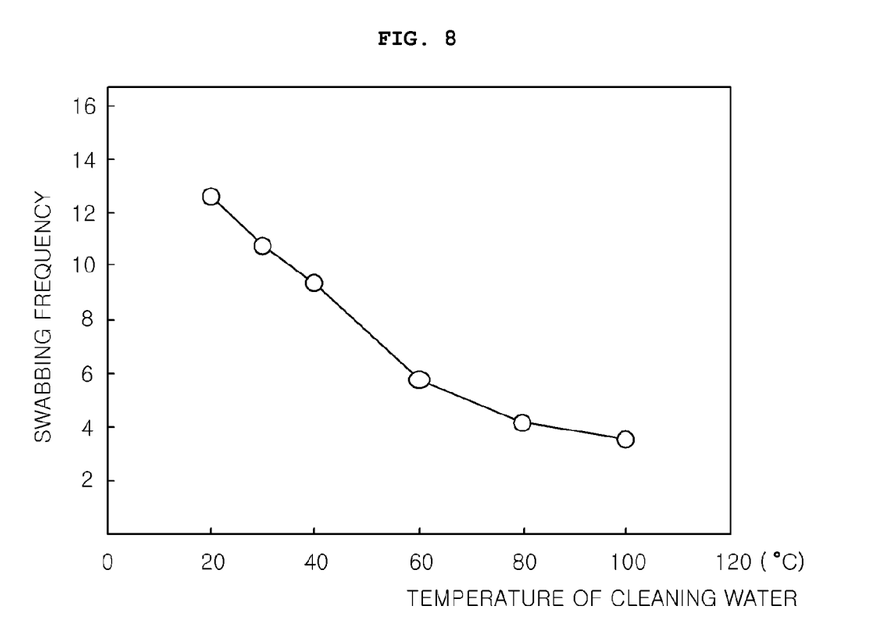
FIG. 8 is a graph showing the differences in cleaning frequency according to the temperature of cleaning water in the embodiment of the cooker according to the present invention.
Figure 9:
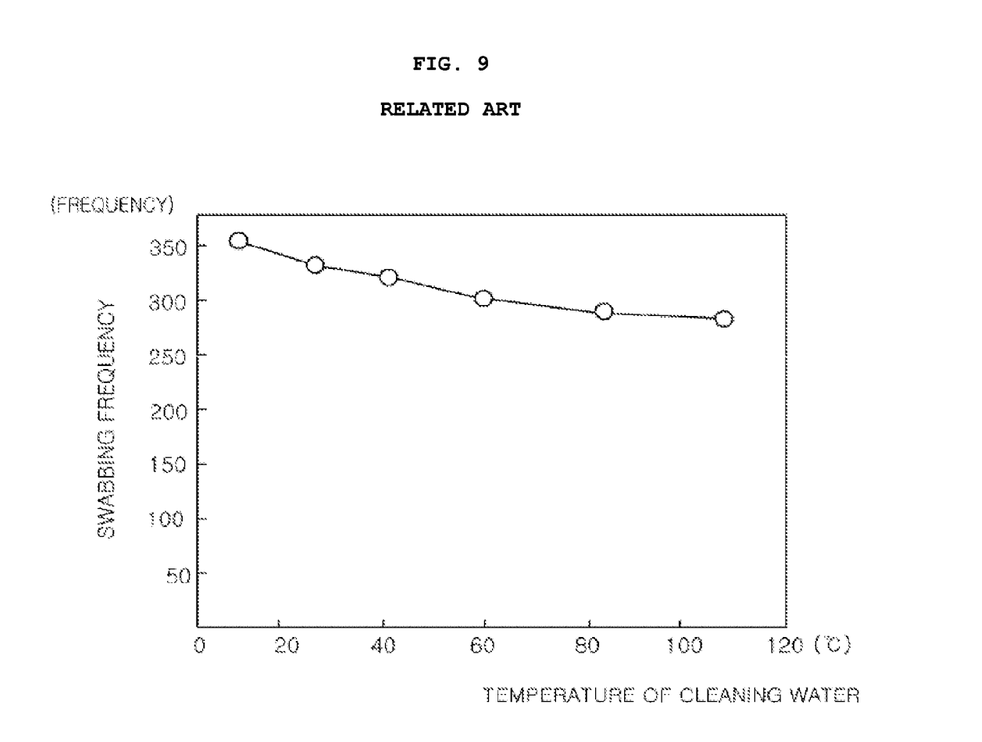
FIG. 9 is a graph showing the differences in cleaning frequency according to the temperature of cleaning water in the cooker according to the related art.
Figure 10:
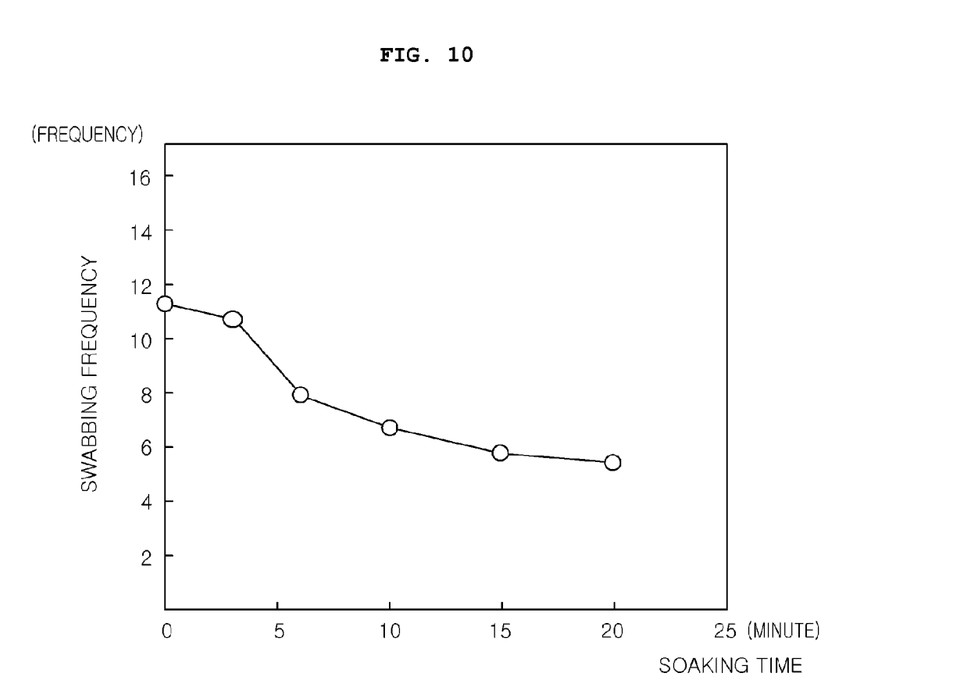
FIG. 10 is a graph showing the differences in cleaning frequency according to the soaking time of cleaning water in the embodiment of the cooker according to the present invention.
Figure 11:
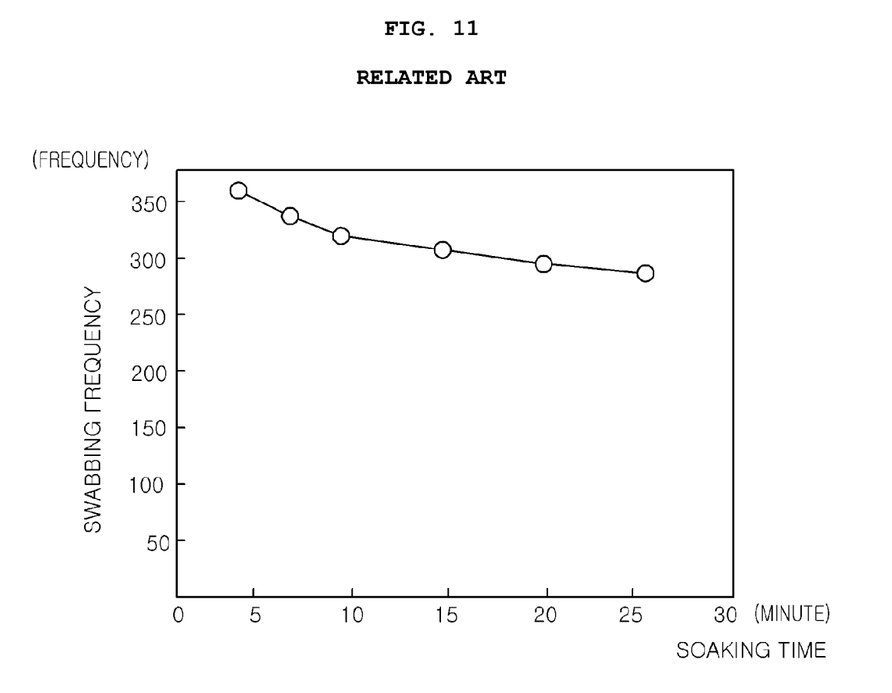
FIG. 11 is a graph showing the differences in cleaning frequency according to the soaking time of cleaning water in the cooker according to the related art.

FIG. 7 is a control flow chart showing an embodiment of the method of manufacturing the cooker according to the present invention. FIG. 8 is a graph showing the differences in cleaning frequency according to the temperature of cleaning water in the embodiment of the cooker according to the present invention. FIG. 9 is a graph showing the differences in cleaning frequency according to the temperature of cleaning water in the cooker according to the related art. FIG. 10 is a graph showing the differences in cleaning frequency according to the soaking time of cleaning water in the embodiment of the cooker according to the present invention. FIG. 11 is a graph showing the differences in cleaning frequency according to the soaking time of cleaning water in the cooker according to the related art.

First, referring to FIG. 7, if cooking of food inside a cooking chamber 13 is completed, cleaning water is supplied to the inside of the cooking chamber 13 (S31). At this time, the cleaning water is supplied to the inside of the cooking chamber 13, in a state where the cooking chamber 13 is shielded by a door 25. Also, the supply of the cleaning water may be performed by a user or may be performed by a separate cleaning water supplying unit 26. And, if the cleaning water is supplied to the inside of the cooking chamber 13, a heating source is operated so that heat is supplied to the inside of the cooking chamber 13 (S33).

Next, if the heating source is operated, it is determined whether the temperature of the cleaning water supplied to the inside of the cooking chamber 13 reaches a preset cleaning temperature (S35). And, if it is determined that the temperature of the cleaning water supplied to the inside of the cooking chamber 13 reaches the cleaning temperature in step S35, the operation of the heating source is terminated (S37). And, if the operation of the heating source is terminated, it is determined whether a preset soaking time has passed (S39).

The cleaning temperature and the soaking time in step 35 and step 39 are set to a temperature and time to allow the cleaning water to be absorbed to the inner surface of the cooking chamber 13, substantially, the surface of the second coating layer 40, such that the pollutants generated, while cooking food inside the cooking chamber 13, can be sufficiently soaked with cleaning water.

If it is determined that the soaking time has passed in step 39, an output unit 17B informs a user of cleaning completion (S41). Thereafter, the user can open the cooking chamber 13 by opening the door 25 and wipe the inside of the cooking chamber 13. The removal of the pollutants absorbed to the inner surface of the cooking chamber 13, more specifically, the second coating layer 40, is performed as the Van der Waals interaction between the second coating layer 40 containing hydrophilic components and the pollutants is weakened by the hydrogen bonding among the cleaning water that is a polar solvent supplied to the second coating layer 40 and the inside of the cooking chamber 13.

More specifically, if the polar solvent having abundant hydrogen bonding such as water is supplied to the inside of the cooking chamber 13, the molecular interaction between the second coating layer 40 and the pollutants, that is, the Van der Waals interaction 1-2 kcal/mol, is weakened by the bonding between oxygen that is double-bonded to phosphorus pentoxide ($P_2O_5$) that constitutes the second coating layer 40 and water, that is, the hydrogen bonding 3-7 kcal/mole between oxygen of the second coating layer 40 and water molecules. In other words, the Van der Waals interaction between non-polar polymers absorbed to the polar surface is weakened by the hydrogen bonding between the polar surface and water, if moisture or steam is infiltrated. Therefore, non-polar polymers unstably absorbed to the polar surface can be easily removed by relatively small physical force. In the present embodiment, the hydrogen bonding with water that is polarity is induced by a pair of non-covalent electrons of oxygen that is double-bonded to the hydrophilic component of the second coating layer 40, that is, phosphorus pentoxide ($P_2O_5$), so that the Van deWaals interaction between the second coating layer 40 and the pollutants is weakened, thereby making it possible to easily remove the pollutants from the second coating layer 40 with small physical force. In other words, with the present invention, the much easier removal of the pollutants can be expected compared to the related art in which the pollutants are absorbed into the enamel coating layer formed of general ceramic material by the chemical bonding therebetween.

This can be more easily appreciated with reference to FIGS. 8 through 11. FIGS. 8 and 9 show swabbing frequency according to the temperature of cleaning water in a state where a chicken is heated inside the cooking chamber 13 at a temperature of 230° C. for one and a half hours, the cleaning water is supplied to the inside of the cooking chamber 13, and then a soaking time of three minutes is passed. In other words, as shown in FIG. 8, in the present invention, the pollutants absorbed to the inner surface of the cooking chamber 13 can be removed by swabbing of approximately six to twelve times. However, as shown in FIG. 9, the pollutants absorbed to the inner surface of the cooking chamber are removed by swabbing of three hundred times or so. Also, FIGS. 10 and 11 show swabbing frequency according to a soaking time in a state where a chicken is heated inside the cooking chamber 13 at a temperature of 230° C. for one and a half hours and cleaning water at 20° C. is supplied to the inside of the cooking chamber 13. In other words, as shown in FIG. 10, the pollutants absorbed to the inner surface of the cooking chamber 13 can be removed by swabbing of approximately four to thirteen times. However, as shown in FIG. 11, the pollutants absorbed to the inner surface of the cooking chamber are removed by swabbing of three hundred times or so.

Meanwhile, in the embodiment of the present invention, as the factors affecting the removal of the pollutants absorbed to the inner surface of the cooking chamber 13, there may be (1) the ratio of component of the second coating layer, (2) the contact state and contact area between the polar solvent and the second coating layer, (3) the temperature of the polar solvent, (4) the contact time between the polar solvent and the second coating layer, etc.

Herein, the temperature of the polar solvent and the contact time between the polar solvent and the second coating layer may be represented by the temperature of the cleaning water and the soaking time by the cleaning water. In other words, the removal of the pollutants absorbed to the inner surface of the cooking chamber 13, that is, the cleaning, may be different according to the temperature of the cleaning water and the soaking time of the cleaning water.

Therefore, referring to FIG. 8 again, it can be appreciated that the swabbing frequency in the cooker according to the present invention, that is, the cleaning, is different according to the temperature of the cleaning water supplied to the inside of the cooking chamber 13. More specifically, in the embodiment according to the present invention, it can be appreciated that if the temperature of the cleaning water supplied to the inside of the cooking chamber 13 is increased to be 40° C. or higher, the swabbing frequency for removing the pollutants absorbed to the inner surface of the cooking chamber 13 is significantly reduced. However, if the temperature of the cleaning water supplied to the inside of the cooking chamber 13 is increased to be 60° C. or higher, a greater amount of the cleaning water supplied to the inside of the cooking chamber 13 may be lost by evaporation so that it may, on the contrary, hinder the overall cleaning process of the inner surface of the cooking chamber 13.

Referring to FIG. 10 again, it can be appreciated that the swabbing frequency in the cooker according to the present invention, that is, the cleaning, is different according to the soaking time by the cleaning water supplied to the inside of the cooking chamber 13. More specifically, in the embodiment according to the present invention, if the soaking time by the cleaning water supplied to the inside of the cooking chamber 13 is increased to be four minutes or more, preferably, six minutes or more, the swabbing frequency for removing the pollutants absorbed into the inner surface of the cooking chamber 13 is significantly reduced.

However, as shown in FIGS. 10 and 11, it can be appreciated that in the case of the cooker according to the related art, that is, in the case where the general enamel coating layer is coated on the inner surface of the cooking chamber, the swabbing frequency is not significantly changed compared to the present invention, despite the change in the temperature of the cleaning water and the soaking time. Although the swabbing frequency is also changed in the related art according to the increase in the temperature of the cleaning water and the increase in the soaking time, significantly many more swabbings are required compared to the present invention so that the reduction in the swabbing frequency according to the increase in the temperature of the cleaning water and the increase in the soaking time may be considered to be insignificant.

While the present invention has been described in connection with certain exemplary embodiments, it would be appreciated by those skilled in the art that changes might be made in this embodiment without departing from the principles and spirit of the invention, the scope of which is defined in the claims and their equivalents.

In the present embodiment, the first and second coating layers are described to be coated on the surface of the cavity corresponding to the inner surface of the cooking chamber, but the positions of the first and second coating layers are not always limited thereto. In other words, the first and second coating layers may be coated on other portions to which the pollutants generated during the cooking process of food inside the cooking chamber are absorbed, for example, the backside of the door.

Moreover, in the present embodiment, the temperature of the cleaning water supplied to the cooking chamber is described to be heated by the heating source to reach the cleaning temperature, but it is not always limited thereto. For example, the cleaning water in a state where it reaches the cleaning temperature may be supplied to the inside of the cooking chamber or may be heated by a separate heating source rather than the heating source, that is, the heating source that provides heating for cooking food inside the cooking chamber.

Furthermore, in the present embodiment, the cleaning water is described to be supplied to the inside of the cooking chamber, but steam rather than the cleaning water may also be supplied to the inside of the cooking chamber.

With the cooker, and the methods of manufacturing and controlling the same constituted as described above, the first coating layer that is a general ceramic enamel layer and the second coating layer that includes phosphorus oxide-based components are coated on the surface of the cavity corresponding to the inner surface of the cooking chamber. Therefore, the pollutants generated during the cooking process of food inside the cooking chamber and absorbed into the second coating layer can be easily removed.

What is claimed is:
1. A cooker system comprising:
   a cooker comprising:
      a main body;
      a cavity in the main body to form a cooking chamber in which food is cooked;
      a heater to provide heat for cooking food inside of the cooking chamber;
      a control panel on the main body including an output unit that outputs a visual or auditory signal;
      a door that opens and closes the cooking chamber;
      a ground coating layer on a wall of the cavity, the ground coating layer comprising ceramic components that constitute an enamel coating layer; and
      a cover coating layer on an outer surface of the ground coating layer, the cover coating layer comprising phosphorus oxide components,
      wherein the cover coating layer includes 27.1-35.3 wt % P205, 14.6-28.4 wt % Al2O3, 12.8-20.3 wt % ZrO2, 18.7-28.8 wt % mother glass constitution components, and 17.2-25.4 wt % ceramic fillers, and
      wherein the ceramic fillers comprise one selected from the group of ZrSiO4, ZrO2.SiO2, eucryptite, and 2MgO.2Al2O3.5SiO2; and
   a cleaning water supplying unit for supplying cleaning water to the inside of the cooking chamber,
   wherein the control panel monitors a soaking time of the cleaning water inside the cooking chamber and the output unit outputs the visual or auditory signal after a preset soaking time has passed.

2. The cooker system of claim 1, wherein the cover coating layer includes 28.7-33.4 wt % $P_2O_5$, 15.2-24.3 wt % $Al_2O_3$, 13.5-17.2 wt % $ZrO_2$, 19.6-26.5 wt % mother glass constitution components, and 17.8-22.4 wt % ceramic fillers.

3. The cooker system of claim 2, wherein the mother glass constitution components are selected from the group consisting of BaO, $K_2O$, $Na_2O$, $Co_2O_3$, ZnO, $Li_2O$, $TiO_2$, $B_2O_3$, $P_2O_5$, and $SiO_2$.

4. The cooker system of claim 1, further comprising a convection device in the cooking chamber.

* * * * *